Jan. 9, 1968 L. B. HOLMAN 3,362,524
MATERIAL HANDLING VIBRATING APPARATUS
Filed June 15, 1966 4 Sheets-Sheet 1
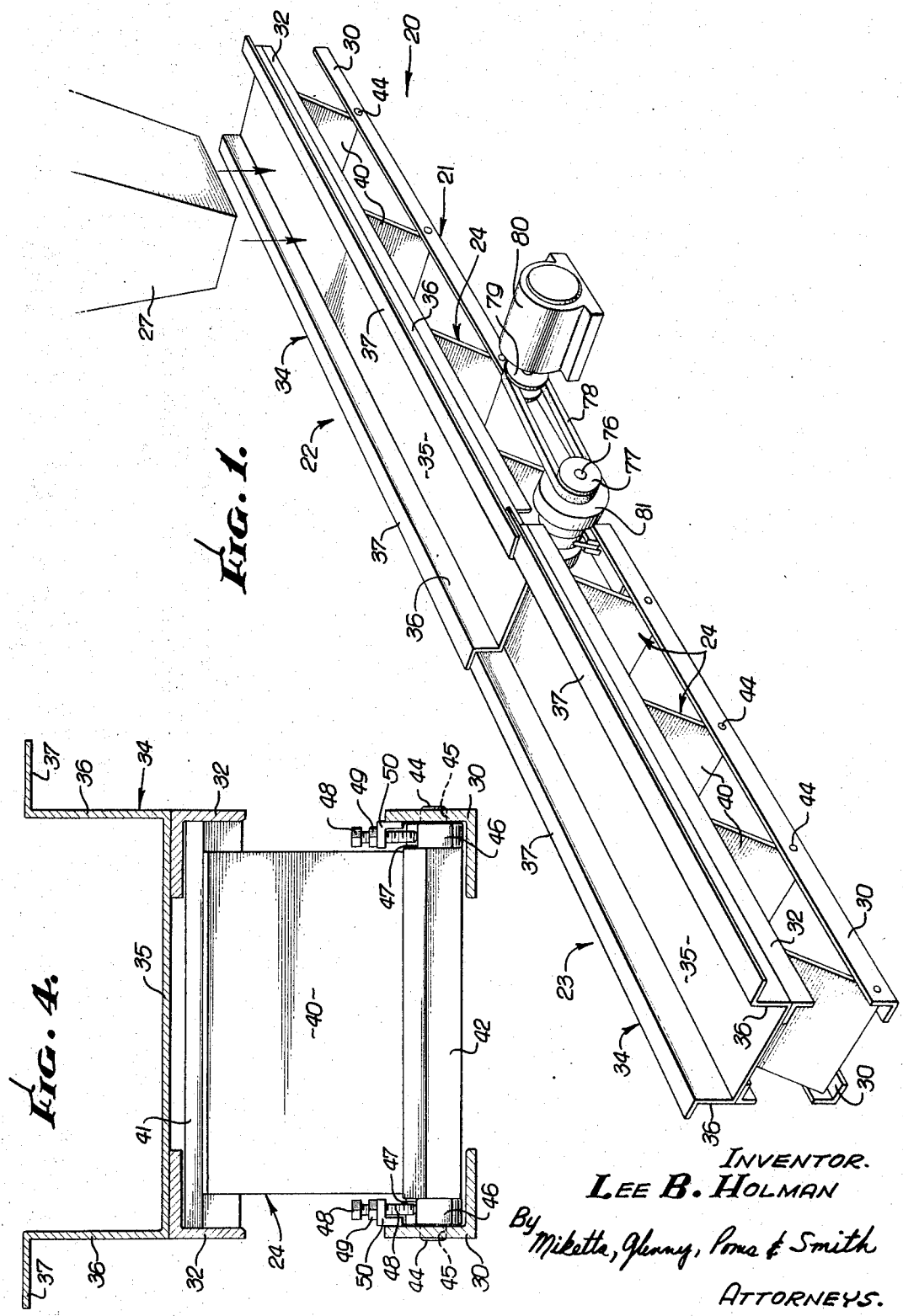
INVENTOR.
LEE B. HOLMAN
By Miketta, Glenny, Poms & Smith
ATTORNEYS.

Jan. 9, 1968  L. B. HOLMAN  3,362,524
MATERIAL HANDLING VIBRATING APPARATUS
Filed June 15, 1966  4 Sheets-Sheet 2
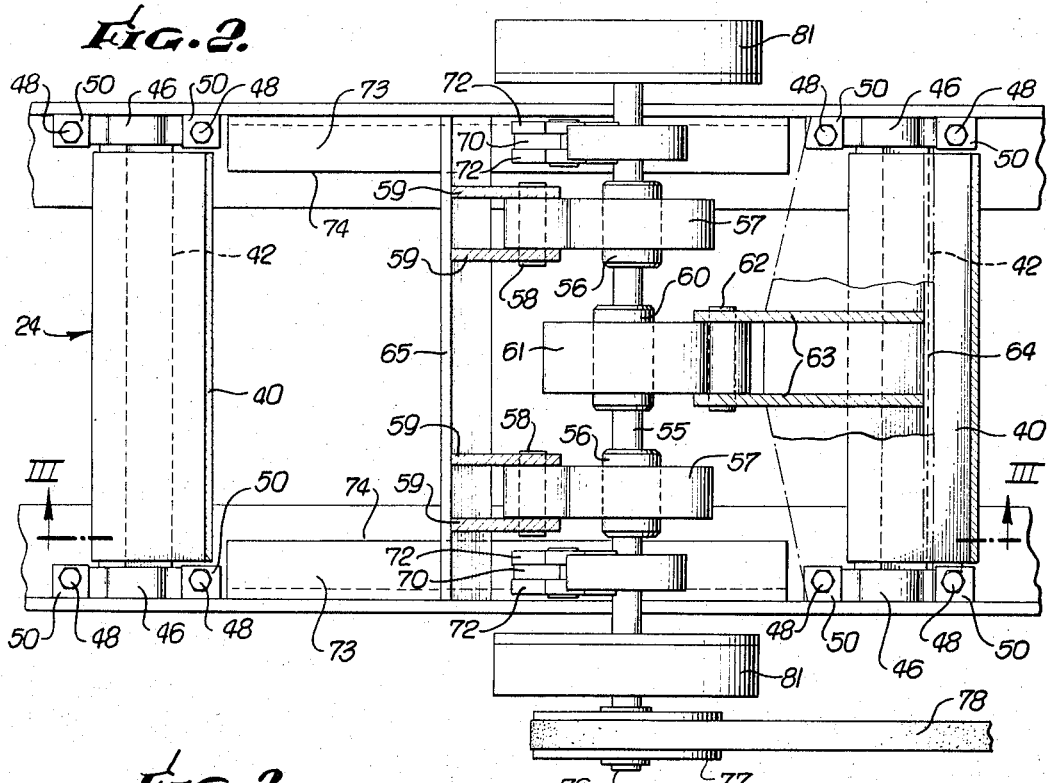
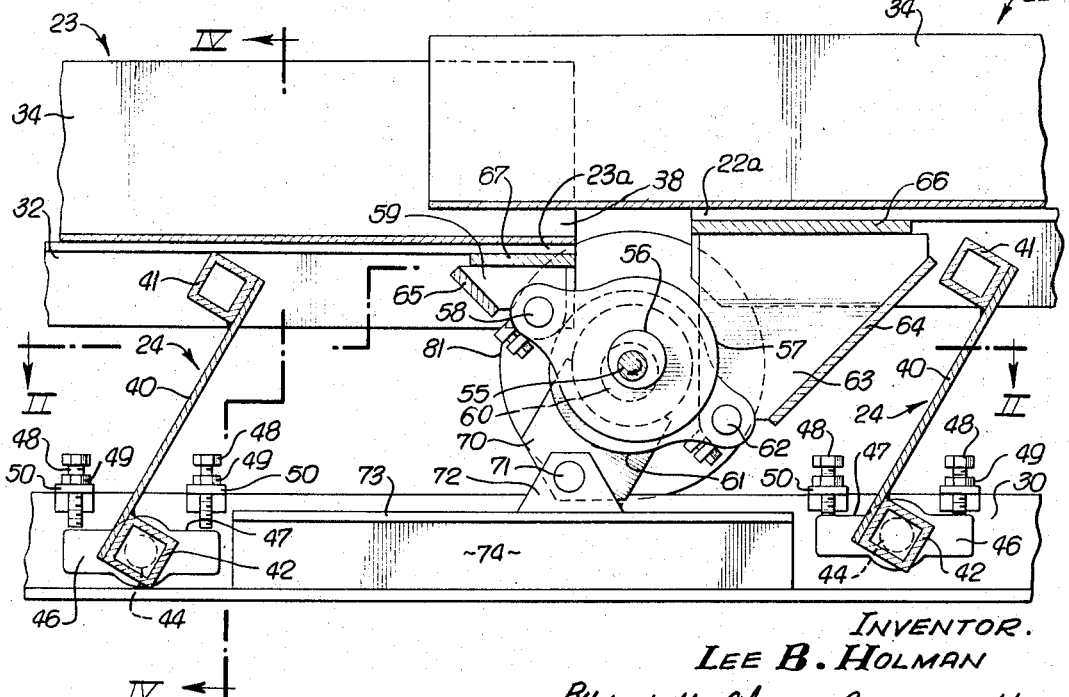
INVENTOR.
LEE B. HOLMAN
By Miketta, Glenny, Poms & Smith
ATTORNEYS.

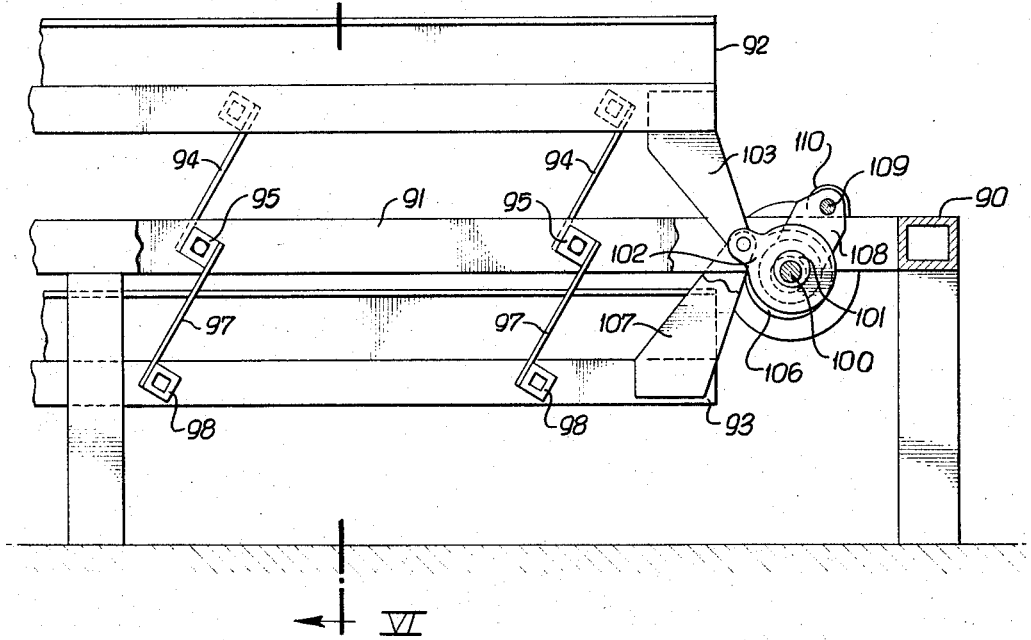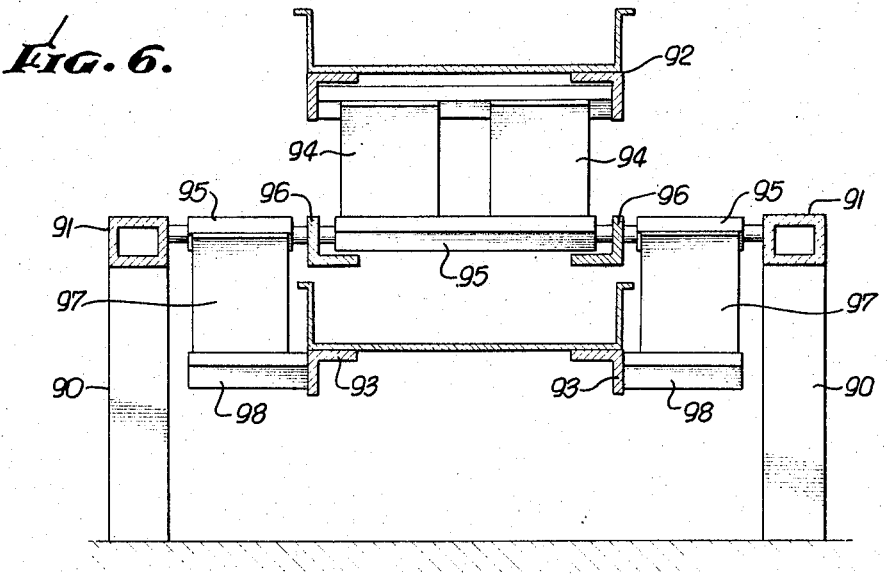

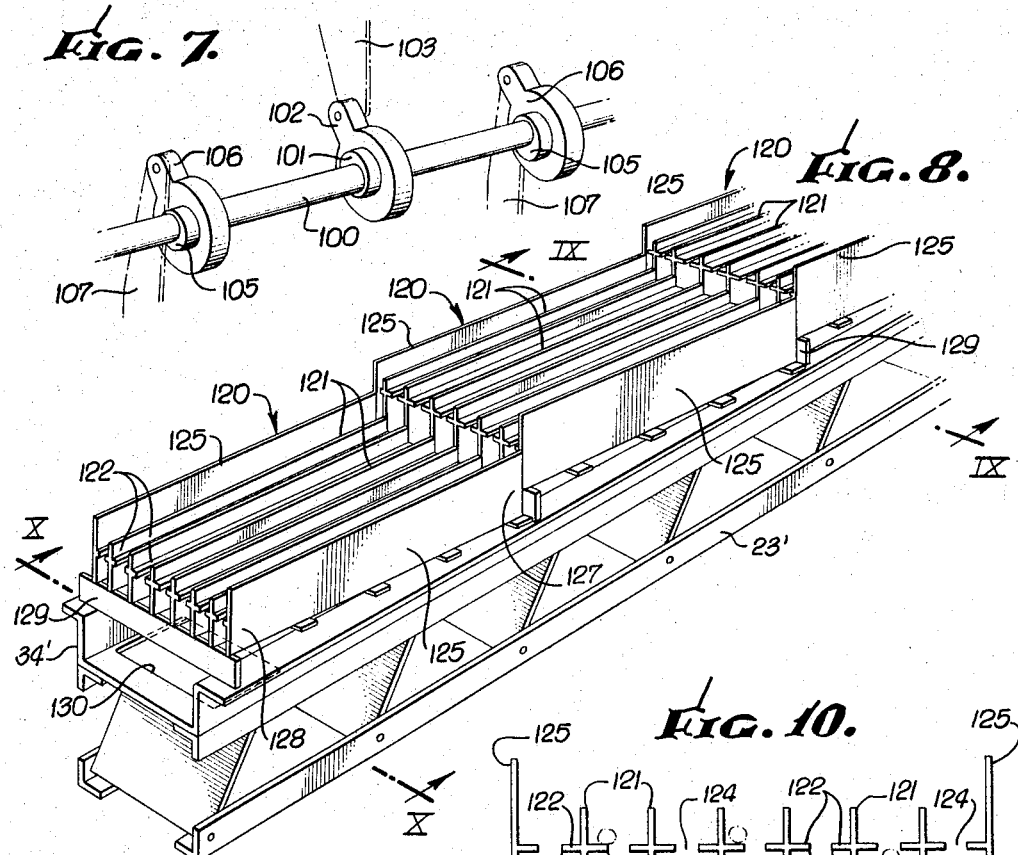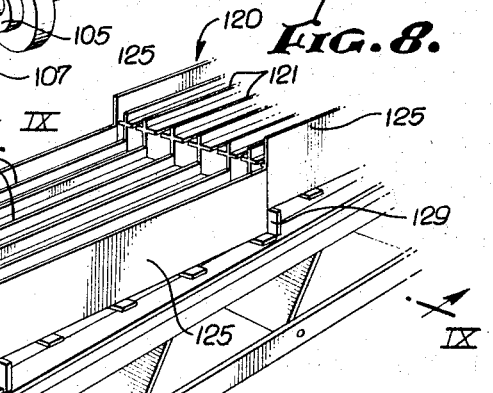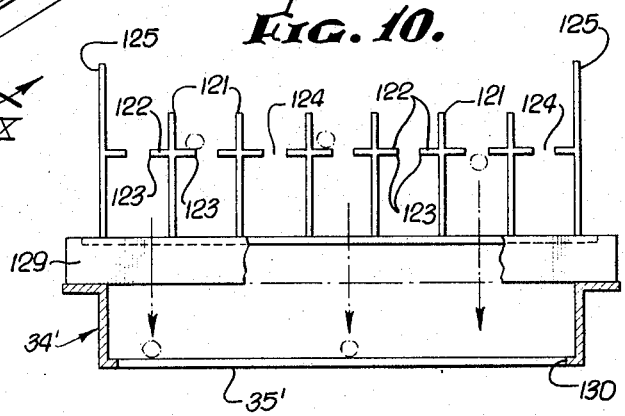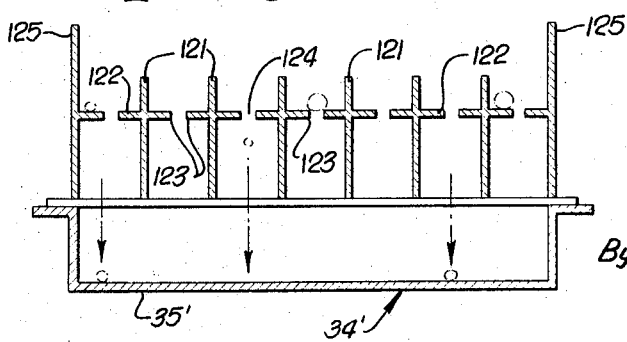

United States Patent Office 3,362,524
Patented Jan. 9, 1968

3,362,524
MATERIAL HANDLING VIBRATING APPARATUS
Lee B. Holman, Whittier, Calif., assignor to State Steel Products, Inc., City of Industry, Calif., a corporation of California
Filed June 15, 1966, Ser. No. 557,838
10 Claims. (Cl. 198—220)

ABSTRACT OF THE DISCLOSURE

A vibrating conveyor having a longitudinally extending base frame and at least a pair of adjacent conveyor sections resiliently supported on the base frame by leaf members inclined to the longitudinal axis of the sections. Actuating means are supported from adjacent ends of the conveyor sections and include eccentric connections to each conveyor section, the eccentric connetions being disposed at 180° and lying in a plane inclined to the longitudinal axis of the sections. Stabilizing means including a stabilizing member disposed at an angle to the plane of the eccentric connections is pivotally mounted on the base frame. Resilient and vibratory forces assist each other in moving material along the conveyor sections while avoiding transmission of vibration to the base frame.

---

This invention relates to material handling apparatus for flowable discrete materials and more particularly to such apparatus of vibrating conveyor type utilized to move and transport discrete material and to separate and grade such material. The invention also particularly contemplates a novel construction and manner of actuating or imparting vibrations to the vibrating conveyor means.

Prior proposed vibrating conveyor constructions have included longitudinally extending trays or decks to which vibration is imparted in order to advance material therealong. Such longitudinally extending trays were supported by resilient means and were driven by various actuating means usually connected to the conveyor construction at one end thereof or to the central portion of an integral continuous deck or tray. Such actuating means for such prior proposed constructions imparted vibrations not only to the conveyor construction but also to the supporting floor or building structure and various counterbalancing or cushioning means were employed to reduce transmission of vibrations to the supporting structure. Moreover, when relatively heavy loads were being moved by such prior conveyor constructions, motor means of substantial horsepower were required for operating the conveyor. Additional weights were often added to counterbalance force components which otherwise would be transmitted to the supporting structure.

In general, the present invention contemplates a novel vibrating conveyor means in which force components, heretofore neutralized by various devices, contribute to the work of moving or separating material. In other words, vibrational forces which were usually transmitted to the supporting building constructure are now effectively utilized and transmitted to moving of material.

The present invention contemplates a multi-section vibrating conveyor means in which two adjacent conveyor sections in tandem relation are operably connected to an actauting means which is supported from adjacent ends of the conveyor sections in such a manner that longitudinal and limited vertical vibrations are imparted to each conveyor section alternately and in opposite directions and horizontal lateral vibrations are restricted and virtually eliminated. Vibrational forces which are of the type and diretcion which might be transmitted to the floor are effectively cancelled by the construction of the multisection conveyor and actuating means of the present invention.

The principal object of the present invention is to disclose and provide a novel construction and operation of a vibrating conveyor means to effectively utilize forces employed toward the transportation, movement, and separation of material.

An object of the present invention is to disclose and provide a material handling apparatus which is readily adaptable to various types of material for mechanical feeding of such material and readily modified so that the apparatus may be used for grading and separating.

Another object of the invention is to disclose and provide a vibrating conveyor means wherein the actuating means to impart vibration to the conveyor means is arranged in novel manner between two sections of such conveyor means.

Another object of the invention is to disclose and provide a novel vibrating conveyor means wherein the actuating means are yieldably limitedly supported from adjacent ends of conveyor sections arranged in tandem or, in another example, in vertically stacked relation.

A further object of the invention is to disclose and provide a vibrating conveyor means wherein lateral motion of the conveyor means is effectively restricted.

Still another object of the invention is to provide a vibrating conveyor means wherein motor means of relatively small horsepower may be utilized to drive the actuating means.

Still another object of the invention is to disclose and provide a vibrating conveyor means including conveyor sections supported by resilient means which may be subject to prestressing in a novel manner whereby the conveyor means may be adjusted to most effectively handle a particular material.

A still further object of the invention is to disclose and provide a vibrating conveyor means wherein a partially floating cam-shaft of an actuating means for the conveyor means is connected to stabilizer means which permits limited controlled yielding of the shaft under load for cooperation with the resilient means which support the conveyor sections.

Generally speaking, the present invention contemplates a vibrating conveyor means including at least two conveyor sections having proximate conveyor ends adjacent and in overlapping relationship so as to permit relative vertical movement therebetween. The conveyor sections are resiliently mounted on a base frame and the proximate conveyor section ends support and are connected by a drive cam-shaft positioned between said section ends and connected by pivotally mounted stabilizer rods to the base frame. The shaft is connected to a drive motor means through a pulley belt arrangement whereby the shaft is free to limitedly move with respect to vibrational forces imparted to the conveyor sections and as restricted by the stabilizer means.

Various other advantages of the present invention will be readily apparent from the following description of the drawings in which exemplary embodiments of the present invention are shown.

In the drawings:

FIG. 1 is a perspective view of a material handling apparatus embodying this invention.

FIG. 2 is a fragmentary, enlarged, horizontal, sectional view taken in the plane indicated by line II—II of FIG. 3 and at the junction of the conveyor sections shown in FIG. 1.

FIG. 3 is a vertical, sectional view taken in the plane indicated by line III—III of FIG. 2.

FIG. 4 is a vertical, transverse, sectional view taken in the plane indicated by line IV—IV of FIG. 3.

FIG. 5 is a fragmentary side elevational view of a material handling apparatus embodying a modification of the present invention.

FIG. 6 is a vertical, transverse, sectional view taken in the plane indicated by line VI—VI of FIG. 5.

FIG. 7 is a fragmentary perspective schamatic view illustrating the crank and eccentric arrangement of the drive means shown in FIG. 5.

FIG. 8 is a fragmentary perspective view of a material handling apparatus as shown in FIG. 1, equipped with a plurality of grading decks.

FIG. 9 is a vertical, transverse, sectional view taken in the plane indicated by line IX—IX of FIG. 8.

FIG. 10 is a vertical, transverse, sectional view taken in the plane indicated by line X—X of FIG. 8.

From the above description and consideration of the drawings, it will be apparent that the present invention may be utilized as a mechanical feeder or vibrating conveyor means for continuously moving and transporting flowable and discrete materials or produce longitudinally along the apparatus, or may be utilized as a grading and separating apparatus when the vibrating conveyor means shown in FIG. 1 is equipped with selected grading decks. Since the motion imparted by the conveyor means to the material is essentially the same in both embodiments, the apparatus which is utilized as a vibrating conveyor means will be first described.

In general, a material handling apparatus or a vibrating conveyor means 20 may comprise an elongated base frame means 21, and at least two conveyor sections, namely a feed section 22 and a discharge section 23 supported above base frame means 21 by a plurality of longitudinally spaced inclined resilient means 24. Centrally of base frame means 21 and adjacent proximate conveyor section ends of conveyors 22 and 23 actuating means are provided for imparting selected vibrations to the conveyor sections in a novel manner and without transmitting such vibrations to a floor or support surface. Also centrally of the base frame means may be provided means for driving the actuating means for the conveyor sections. Material to be transported or separated may be fed to the other end of conveyor feed section 22 as by suitable means such as a chute or hopper 27.

Base frame means 21 may include a pair of parallel longitudinally extending base frame members 30 of angle section and secured in suitable manner as by bolting to a supporting floor surface. Base frame means 21 may be continuous and have a length to 60 feet or more. In greater lengths the structure shown in FIG. 1 may comprise a central drive portion including conveyor sections 22, 23 and at opposite ends thereof may be connected auxiliary or extension conveyor sections whereby the overall length and load conditions of the vibrating conveyor means may be modified and changed depending upon the material to be handled as more fully described hereinafter.

Similarly constructed feed and discharge conveyor sections 22 and 23 may each comprise a pair of parallel, longitudinally extending angle section frame members 32 spaced above base frame members 30. As best shown in FIG. 3, base frame members 32 of feed section 22 may be supported slightly higher than the corresponding frame members 32 of discharge section 23. The frame members 32 of each section support and secure channel means 34 of suitable sheet metal gauge including a bottom wall 35 spaced side walls 36 and outwardly extending horizontal flanges 37. Channel means 34 on feed section 22 may extend slightly over and be vertically spaced as at 38 (FIG. 3) from the adjacent end of the discharge channel means 34. Such overlapping and spacing at 38 permits relative vertical movement of the proximate ends of the conveyor sections occurring during operation of the vibrating conveyor means.

Means resiliently supporting the feed and discharge sections 22 and 23 may include a plurality of longitudinally spaced resilient means 24 which, in this example, may comprise rectangular leaf members 40 each made of suitable metal, or of impregnated multi-ply laminated fibrous material, and the like. Leaf members 40 may be single plate-like members or may be two or more transversely spaced leaf sections mounted either inboardly or outboardly as exemplarily illustrated in FIG. 6. Suitable arrangements of coil springs with inclined axes may also be employed.

In this example, leaf members 40 may be rectangular with upper transverse edge portions secured as by welding to a square section member 41 secured at its ends by suitable means to frame members 32. The bottom edge portion of each leaf 40 may be similarly secured as by welding to a transverse square section member 42 which may be displaced longitudinally relative to top member 41 so that leaf member 40 will be inclined in the direction of the feed section or end at a suitable selected angle such as 60°.

Means for adjustably pivotally supporting bottom member 42 from base frame members 30 may include trunnion pins 44 extending within and secured to opposite ends of transverse member 42. Each trunnion 44 may be received in a suitable port 45 formed in the upstanding leg of angle section frame member 30. At the end of each square section member 42 may be secured, as by welding, a longitudinally extending bar 46 having a top surface 47 against which may seat longitudinally spaced pairs of adjustment screw bolts 48 having threaded connection with nuts 49 fixed to brackets 50 welded to frame member 30. Thus, turning of screw bolts 48 of a pair in opposite directions will tilt bar 46 and leaf 40 fixed thereto. Each leaf 40 of the conveyor and discharge sections may be provided with such adjustment means. In some instances, such adjustment means may be used on only one of such leaves in order to impose a stress on other resilient leaves 40 so that a conveyor section may be pre-stressed in order to vary and control vibration of the conveyor section depending upon the type and quantity of material being fed thereto.

Means for vibrating or actuating conveyor sections 22 and 23 may be supported below and adjacent proximate conveyor end sections 22a and 23a. Such actuating means may comprise a transversely extending horizontal cam-shaft 55 provided with a pair of spaced eccentric bearings 56, each connected by a crank arm 57 to a pivot pin 58 supported from spaced brackets 59 carried by the adjacent conveyor end 23a. Displaced 180° from the maximum eccentric throw of the pair of bearings 56 may be a central eccentric bearing 60 connected to a crank arm 61 which at its other end may be pivotally connected to pin 62 carried by a pair of spaced brackets 63 fixed as by welding to a gusset plate 64 carried by the adjacent conveyor end 22a. The axes of pins 58 and 62 define a plane which preferably lies perpendicular to the inclined plane of leaf 40. As best seen in FIG. 3 the maximum eccentric throws of respective eccentric bearing means 56 and 60 in neutral position lie in a plane perpendicular to the plane of axes of pins 58 and 62 and thereby parallel to the plane of a leaf 40. The conveyor end sections 22a and 23a may be provided with suitable transversely extending frame members such as 64 and 65, which may be welded at their ends to vertical legs of angle section members 32 and brackets 63 and 59 may be welded to said transverse members 64 and 65, respectively, and to top transverse plates 66 and 67. Thus, cam-shaft 55 is pivotally suspended and in a sense floatingly supported between and below the proximate conveyor section ends 22a and 23a.

Means to stabilize the actuating means and cam-shaft 55 may include stabilizing rods or members 70 provided at opposite ends of shaft 55 and pivotally connected at their upper ends to shaft 55 by suitable bearing means. The opposite end of each stabilizing member 70 may be pivotally connected by pin 71 to upstanding bracket means 72 secured as by welding to top flange 73 of an internal angle section member 74 secured to the upstanding leg of frame member 30. The axes of the shaft 55 and the pins 71 of stabilizer members 70 define a plane which lies parallel to leaf 40 and perpendicular to the plane defined by pins 58 and 62.

Means for driving the conveyor actuating means may comprise a shaft extension 76 on shaft 55 on which may be mounted a suitable pulley 77 connected to a drive pulley belt 78. The opposite end of belt 78 may be connected to a pulley 79 which may be supported on the end of a motor shaft which extends from a motor means 80. Motor means 80 may be fixed to a suitable mounting pad on a supporting floor surface outside or externally of frame members 30; it will be understood that the motor means may be disposed internally between base frame members 30. Shaft 55 may carry at one or both ends suitable flywheels 81.

Before describing operation of the conveyor means 20, it should be noted that the conveyor sections 22, 23 form longitudinally extending, overlapping masses which are resiliently supported by the resilient leaf members 40 of each conveyor section. The masses of the conveyor sections are disposed on opposite sides of the axis of shaft 55 which is so arranged with respect to the masses of the conveyor sections that, upon rotation thereof, in a clockwise direction as viewed in FIG. 3, the eccentric bearing means 60 will exert a pulling force on the mass of the conveyor section 22 and the eccentric bearing means 56 will exert a pushing force on the mass of the conveyor section 23. The selected inclination of the leaf members 40 and the relation thereto of the disposition of the eccentric means 56 and 60 imparts to the masses of the sections 22 and 23 both vertical and longitudinal force components, and such force components are transmitted to material carried in the channel means on each of the sections.

It should be noted that in normal inoperative position where the masses of sections 22 and 23 are approximately equivalent, the eccentrics on the cam shaft 55 will be in a neutral position as indicated in FIG. 3. Motor means 80 is adapted to apply an initial heavy starting torque to the shaft 55 in order to move the cam means out of neutral position. After shaft 55 is rotating, the motor load during continuous operation of the conveyor means is substantially reduced because of the resilient action of the spring leaf members 40 which assist in movement of the material and because of the usual action of flywheels 81.

In operation, material may be fed through hopper 27 to feed conveyor section 22 and as it is deposited in the channel means 34, the before-mentioned vibratory forces will be transmitted to the material so that both vertical and longitudinal force components will cause the material to move along the flow path defined by the channel means 34. In FIG. 3, channel means 34 on section 22 overlaps the channel means on section 23 in vertical spaced relation thereto so that material moved by section 22 will be fed to discharge section 23.

In the operation of the conveyor means, since shaft 55 is in effect resiliently supported from the base frame means by the resilient leaf members 40, rotation of the shaft with the eccentric means will cause some displacement of the shaft laterally with respect to its axis in normal position. Stabilizing means 70 which is disposed as above described, affords such yieldable lateral movement of shaft 55. Since the stabilizing means 70 is disposed with its axis in a plane parallel to the normal neutral position of the eccentrics 56 and 60 on shaft 55, vibratory forces which are produced by rotation of shaft 55 are cancelled at that plane and transmission of such vibratory forces to the building structure is effectively eliminated. Shaft 55 is thus limitedly, yieldably, floatingly restrained.

A modified embodiment of the conveyor means of this invention is shown in FIG. 5. A base frame 90 may include side rails 91 supported a selected distance above a floor surface. From side rails 91 may be resiliently supported a top conveyor section 92 and a bottom conveyor section 93, conveyor sections 92 and 93 being of a structure similar to that previously described except that section 22 may include a screw-type bottom wall.

Resilient means comprising pairs of laterally spaced inclined leaf members 94 may support conveyor section 92 from side rails 91 by a transversely extending square section member 95 supported at opposite ends from spaced longitudinally extending angle frame members 96 and from side rails 91. Outwardly of frame members 96, member 95 may carry leaf members 97 which may be connected to outwardly projecting stub member 98 secured to bottom conveyor section 93, leaf members 97 and 94 are connected to conveyor sections 92, 93 and frame members thereof so that they lie in parallel inclined planes. Thus, conveyor section 92 is resiliently yieldably supported above the plane of side rails 91 and the conveyor section 93 is resiliently yieldably supported below the frame members 91. Channel means supported by bottom conveyor section 93 lies directly below top conveyor section 92 and material which may be separated or screened through section 92 will fall between the leaf members 94 to the channel means on bottom conveyor section 93.

Actuating means for conveyor sections 92, 93 is generally shown and may comprise a cam shaft 100 having an eccentric bearing 101 connected by a crank arm 102 to a depending bracket 103 extending downwardly from the adjacent end of conveyor section 92. On opposite sides of eccentric bearing 101 may be provided eccentric bearings 105 connected to crank arms 106 which are pivotally connected to an upstanding bracket 107 secured to the adjacent end of bottom conveyor section 93. As best seen in FIG. 7, eccentric bearing means 105 and 101 are disposed with their maximum eccentric throw in 180° relationship as in the prior embodiment. However, the crank arms 106 and 102 extend in the same direction in the same plane to provide connections to brackets 107 and 103 respectively. The cam shaft 100 may include a shaft extension carrying a flywheel and a pulley wheel for connection to a drive pulley belt connected to a motor means, all of which is not shown because the arrangement is substantially identical to that shown in the prior embodiment.

In this embodiment, cam shaft 100 is limitedly yieldably supported and restrained by stabilizing means 108 connected to shaft 100 by a suitable bearing and pivotally mounted from a pin 109 carried by a bracket 110 on the side rails 91. It should be noted that the plane defined by the axis of shaft 100 and pins 109 lies parallel to the inclined planes of leaf members 94 and 97, that the crank arms 102 and 106 in neutral relation lie in a plane at right angles to the plane of the leaf members and that the eccentric throw in neutral position lies in the plane defined by the axis of the stabilizer members 108 as best seen in FIG. 5.

In operation, rotation of cam shaft 100 will impart vibrations to the conveyor sections 92 and 93 in a manner similar to that of the prior embodiment. Although the conveyor sections are vertically arranged, the particular arrangement of the eccentric means, crank arms, and resilient means produces a vibratory force pattern similar to that of the prior embodiment so that such vibratory forces are not transmitted to the supporting floor surface but are employed to move material in the conveyor sections 92 and 93.

In FIG. 8, a vibrating conveyor means embodying this invention is equipped with a grading or separating deck means 120 in order to grade and separate produce or other material having elongated form, such as string beans. In FIG. 8, conveyor section 23' may be of the same construction and be driven in the same manner as conveyor section 23 of the first embodiment. On top of channel means 34' may be supported a plurality of grading means, each including a plurality of laterally spaced parallel vertically upstanding longitudinally extending walls 121. Each wall 121 has below its top edge a sidewardly horizontally projecting longitudinal rib 122 having longitudinal edge 123 spaced a selected distance 124 from an opposed edge of rib 122 on the adjacent wall. Ribs 122 may be spaced above the floor or bottom wall 35' a distance greater than the maximum length of an article being graded. Side walls 125 are higher than interior walls 121 so as to contain articles on the grading deck. Preferably, ribs 122 are relatively thin so that articles may rapidly pass through space 124.

In this embodiment, the grading decks 120 are arranged on conveyor section 23 in stepped inclined relation. Each grading means 120 may have its feed end 127 seated on flanges of channel means 34 and its discharge end 128 supported by a transverse member 129 in spaced relation above the flanges. Thus, when conveyor section 23 is normally horizontally disposed, the top edges of walls 121 and the parallel ribs 122 lie in upwardly inclined relation to the conveyor section.

The particular grading deck shown in this embodiment may be used for separating or grading elongated articles, such as string beans. String beans fed to the feed end of the first grading deck are normally fed in a tangled mass or group wherein the axis of each green bean is not aligned with the axis of an adjacent or other green beans. While the green beans are vibrated and advanced by such vibrations from the conveyor means, the green beans are jostled and are caused to climb the inclined grading means 120. As a green bean is jostled into longitudinal relation to the walls 121, it will fall between the walls and onto the ribs 122 where longitudinal alignment of the bean is maintained. Upon further vibrations, the green bean will align itself with space 124 and drop through the opening to the bottom wall of the conveyor section 23'. Beans advance along the bottom wall to a discharge opening 130 provided in the bottom wall 35' so that the green beans may pass therethrough and thence onto a suitable conveyor or belt for transportation to storage or to packaging.

The grading means 120 may be provided with openings 124 of different width or ribs 122 of different height. Openings 124 in the first grading means 120 may be smaller than openings 124 in the next adjacent grading means 120 so that string beans of smaller size may be first separated and collected as compared to the green beans collected at successive grading means 120 which may be provided with progressively larger openings 124.

The embodiments of the invention have illustrated discharge of material at ends of the conveyor means or at openings of the bottom wall thereof. It will be understood that, when desired, openings may be made in the side walls of the channel means so that articles being transported or separated may be moved sidewardly off the vibrating conveyor means. Suitable means may be used to deflect material to such side openings if desired.

In the foregoing embodiments of the invention, utilization of spring forces and the eccentric forces to directly move material with a minimum of forces transmitted to a supporting floor structure has been described. In addition to the use of such resilient forces and eccentric forces, it has been observed that when the drive portion of the vibrating means, that is, two adjacent sections with the actuating means therebetween, is supported at opposite ends, base frame members 30 provide horizontal beams capable of resilient deflection. During operation of such a conveyor drive portion, the resiliency of beams 30 impart forces to the vibrating conveyor sections which enhance the forces already being generated by the actuating means and a spring means, thus additional effective work may be obtained from the conveyor means of the present invention when the base frame is so mounted.

The conveyor sections on opposite sides of shaft 55 may include one or more sections, conveyor sections of different length, and the masses of the conveyor sections may be unequally disposed with suitable counterweights positioned on the sections to obtain a desired mass relationship. Any such particular arrangement will depend upon the characteristics of the material being handled and the feeding, separation or grading involved.

All modifications and changes which come within the scope of the appended claims are embraced thereby.

I claim:
1. In a material handling apparatus for discrete material, the combination of:
   a longitudinal frame means;
   at least two conveyor sections, each having at least one conveyor section end proximate to a conveyor section end of the adjacent conveyor section;
   means including a plurality of parallel inclined members resiliently supporting said conveyor sections from the frame means;
   actuating means supported from and interconnecting the aforesaid proximate conveyor section ends for imparting vibrations to said conveyor sections;
   stabilizer means for said actuating means and including a stabilizer member having a longitudinal axis parallel to said inclined members for yieldably interconnecting the actuating means with the frame means;
   and drive means for the actuating means.

2. An apparatus as stated in claim 1 wherein said stabilizing member is pivotally connected to said frame means.

3. An apparatus as stated in claim 1 including means for adjustably loading the resilient support means.

4. An apparatus as stated in claim 3 wherein said resilient support members are inclined,
   and wherein said adjustment means includes means for varying the angle of inclination of a support member.

5. An apparatus as stated in claim 3 wherein said adjustable means includes
   pivotal mounting means for a support member,
   a bracket fixed to said support member,
   and means associated with said frame means cooperable with said bracket for movement of the support member about the pivotal mounting means.

6. A vibrating conveyor means as stated in claim 3 wherein said resilient support means includes leaf members; means for adjusting the inclination of said leaf members with respect to said frame means and associated conveyor section whereby spring loading of said leaf members may be adjustably tuned to dynamic forces acting on said conveyor sections in accordance with varying load masses and speed of rotation of said transverse shaft.

7. In a material handling apparatus for discrete material, the combination of:
   a longitudinal frame means;
   at least two conveyor sections, each having at least one conveyor section end proximate to a conveyor section end of the adjacent conveyor section;
   means resiliently supporting said conveyor sections from the frame means;
   actuating means supported from and interconnecting the aforesaid proximate conveyor section ends for imparting vibrations to said conveyor sections;
   stabilizer means for said actuating means yieldably interconnecting the actuating means with the frame means;
   and drive means for the actuating means;
   said actuating means including means providing eccentric interconnections between the proximate conveyor section ends and including
   a transverse partially floating shaft having
   an eccentric connection to one section end,
   and having another eccentric connection to the other section end,
   said eccentric connections for said section ends being disposed at 180° and lying in a plane inclined to the longitudinal axis of said conveyor sections when in neutral position.

8. In a material handling apparatus for discrete material, the combination of:
a longitudinal frame means;
at least two conveyor sections, each having at least one conveyor section end proximate to a conveyor section end of the adjacent conveyor section;
means resiliently supporting said conveyor sections from the frame means;
actuating means supported from and interconnecting the aforesaid proximate conveyor section ends for imparting vibrations to said conveyor sections;
stabilizer means for said actuating means yieldably interconnecting the actuating means with the frame means;
and drive means for the actuating means;
said actuating means including means providing eccentric interconnections between the proximate conveyor section ends and including
a transverse partially floating shaft having an eccentric connection to one section end,
and having another eccentric connection to the other section end;
said resilient support means including parallel inclined support members lying in planes normal to the plane defined by said eccentric connections in neutral position.

9. In an apparatus as stated in claim 8 wherein said stabilizing means includes a stabilizer member having a longitudinal axis parallel to the plane of said inclined support members.

10. In a material handling apparatus for discrete material, the combination of:
a longitudinal frame means;
at least two conveyor sections, each having at least one conveyor section end proximate to a conveyor section end of the adjacent conveyor section;
means including a plurality of parallel inclined members resiliently supporting said conveyor sections from the frame means;
actuating means supported from and interconnecting the aforesaid proximate conveyor section ends for imparting vibrations to said conveyor sections;
stabilizer means including a stabilizer member having a longitudinal axis and yieldably interconnecting the actuating means with the frame means;
and drive means for the actuating means;
said actuating means including eccentric means for imparting said vibrations,
said eccentric means including eccentric connections for said conveyor sections and disposed at 180° and lying in a plane normal to said axis of said stabilizing member and inclined to the axis of said conveyor sections when in neutral position.

References Cited

UNITED STATES PATENTS

| 2,669,344 | 2/1954 | Flint | 198—220 |
| 3,216,556 | 11/1965 | Burgess | 198—220 |
| 2,751,068 | 6/1956 | Haddox | 198—220 |

FOREIGN PATENTS

| 55,611 | 11/1933 | Norway. |
| 1,110,623 | 10/1955 | France. |
| 1,200,413 | 6/1959 | France. |

EDWARD A. SROKA, *Primary Examiner.*